May 19, 1942.   W. F. LONGFIELD   2,283,505
METALWORKING PRESS
Filed Aug. 2, 1940   10 Sheets-Sheet 1

INVENTOR
WILLIAM F. LONGFIELD
BY Chas. H. Trotter
ATTORNEY

May 19, 1942.　　　W. F. LONGFIELD　　　2,283,505
METALWORKING PRESS
Filed Aug. 2, 1940　　　10 Sheets-Sheet 2
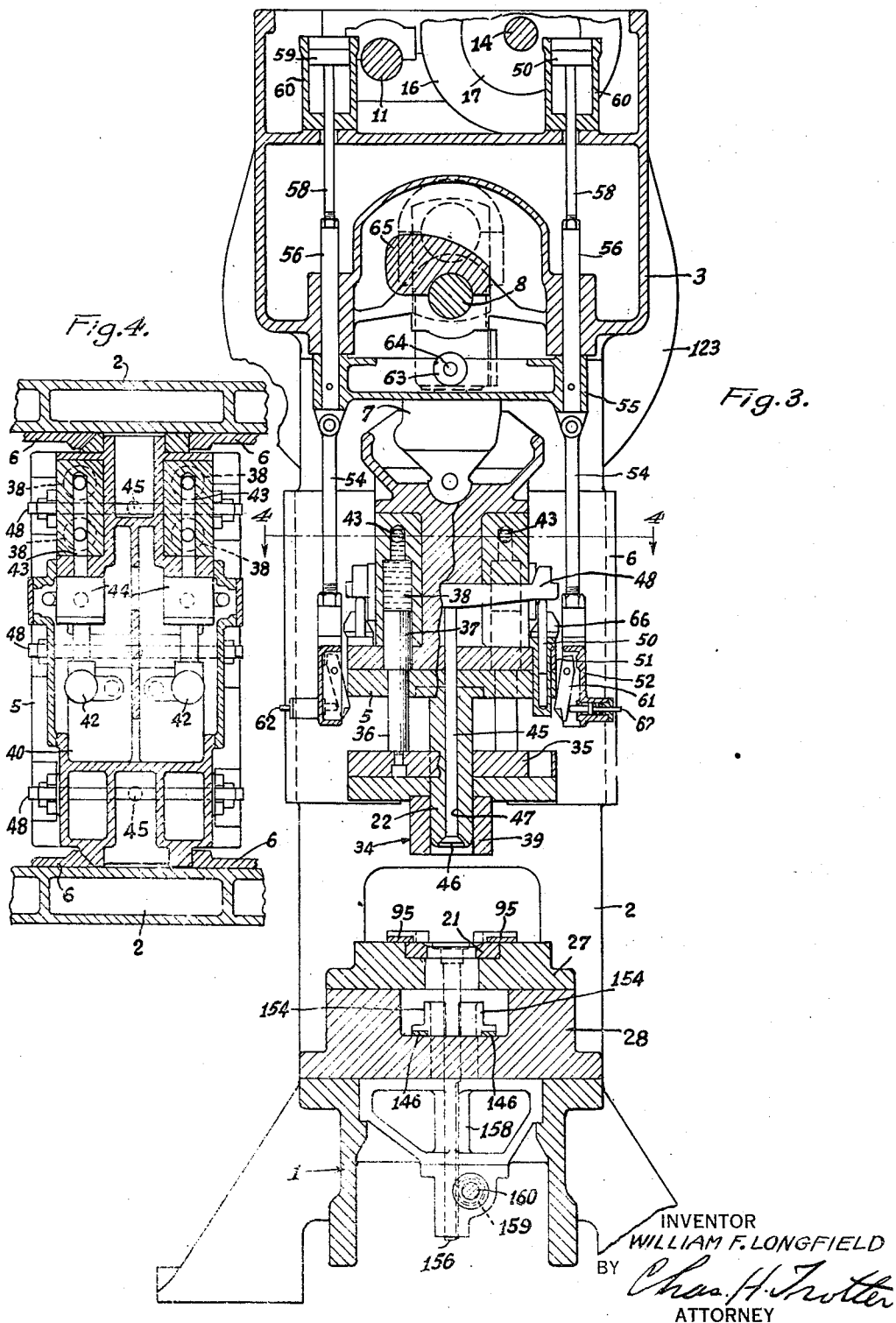
INVENTOR
WILLIAM F. LONGFIELD
BY
Chas. H. Trotter
ATTORNEY INVENTOR
WILLIAM F. LONGFIELD
BY Chas. H. Trotter
ATTORNEY

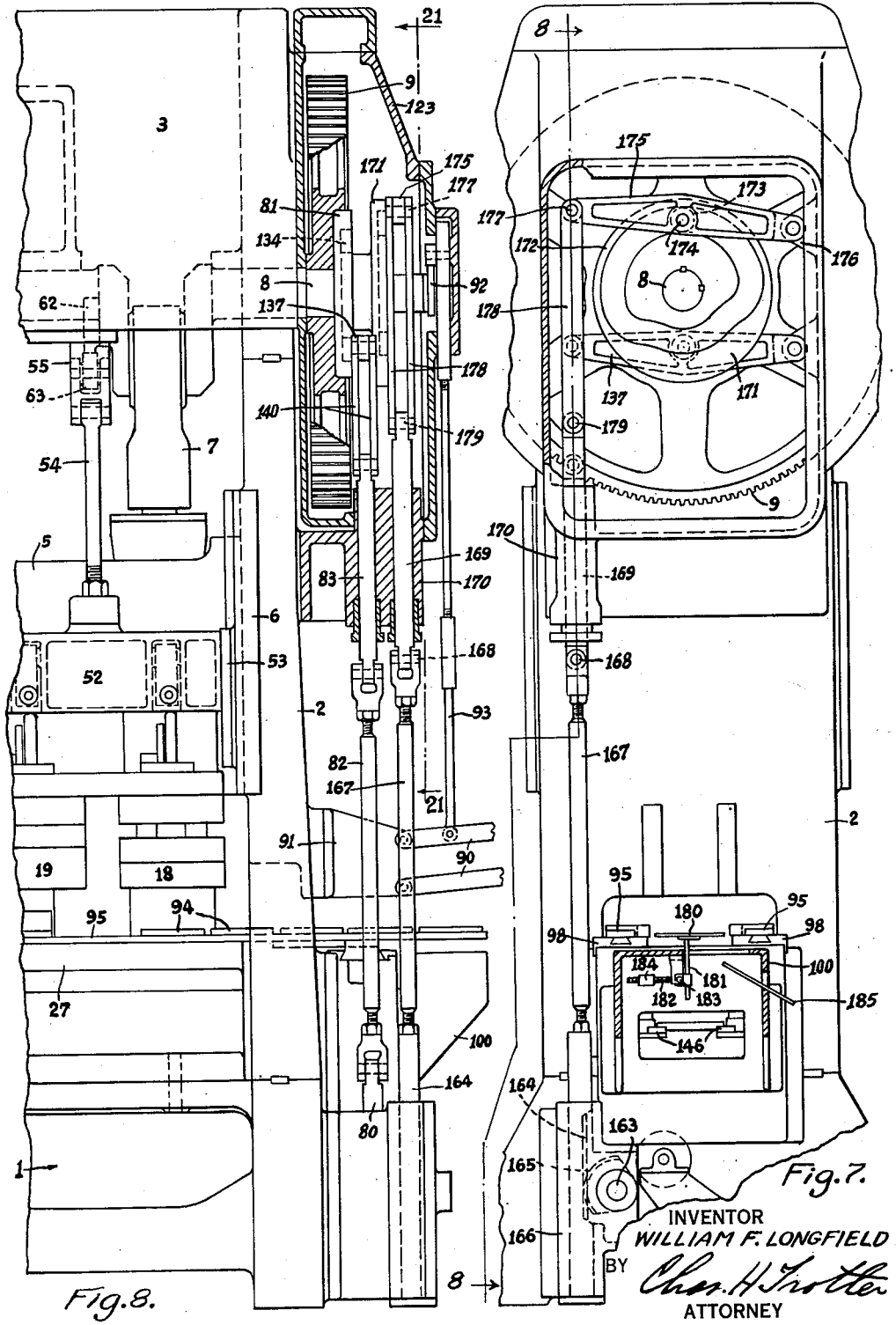

May 19, 1942.　　W. F. LONGFIELD　　2,283,505
METALWORKING PRESS
Filed Aug. 2, 1940　　10 Sheets-Sheet 6

INVENTOR
WILLIAM F. LONGFIELD
BY Chas. H. Trotter
ATTORNEY

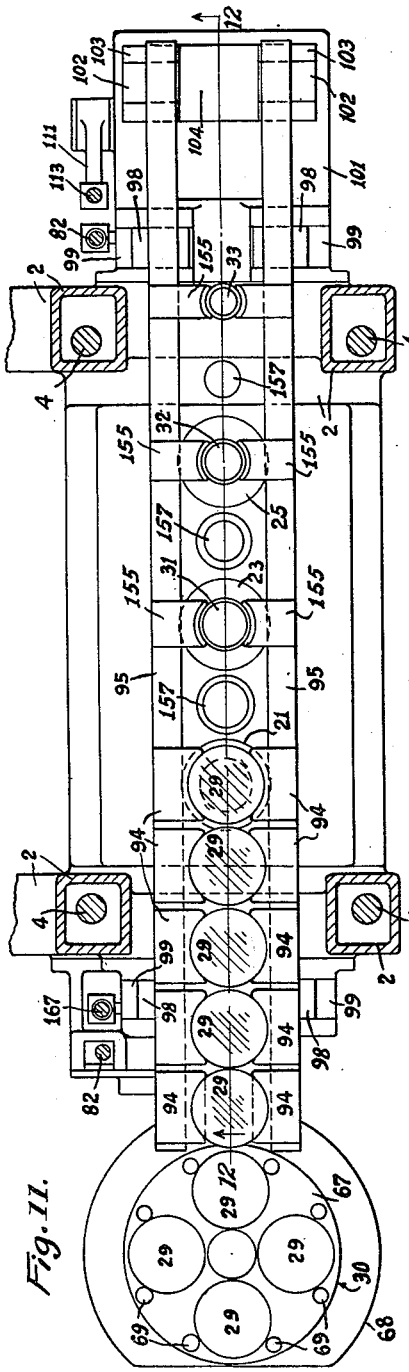

May 19, 1942. W. F. LONGFIELD 2,283,505
METALWORKING PRESS
Filed Aug. 2, 1940 10 Sheets-Sheet 8
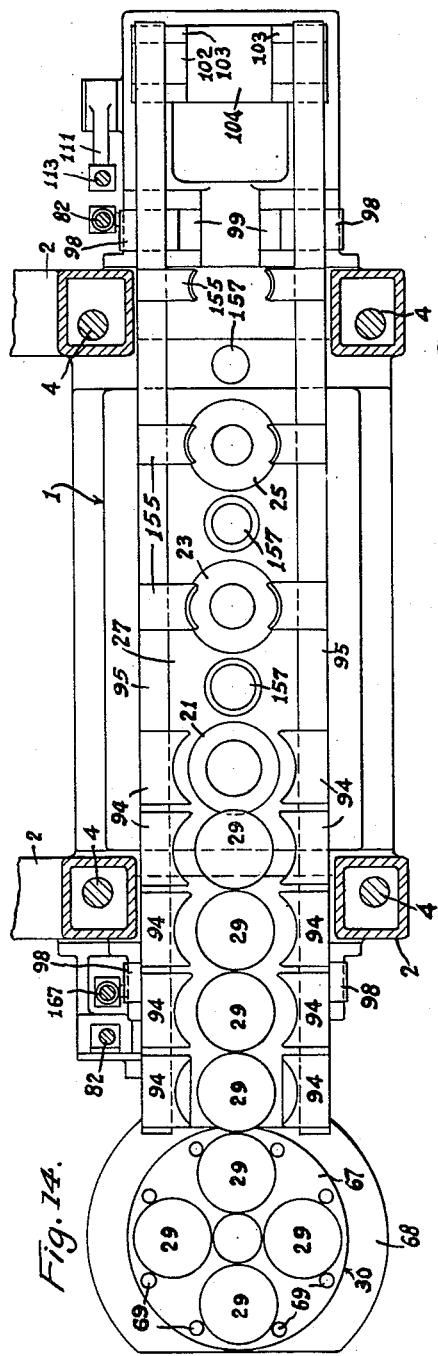
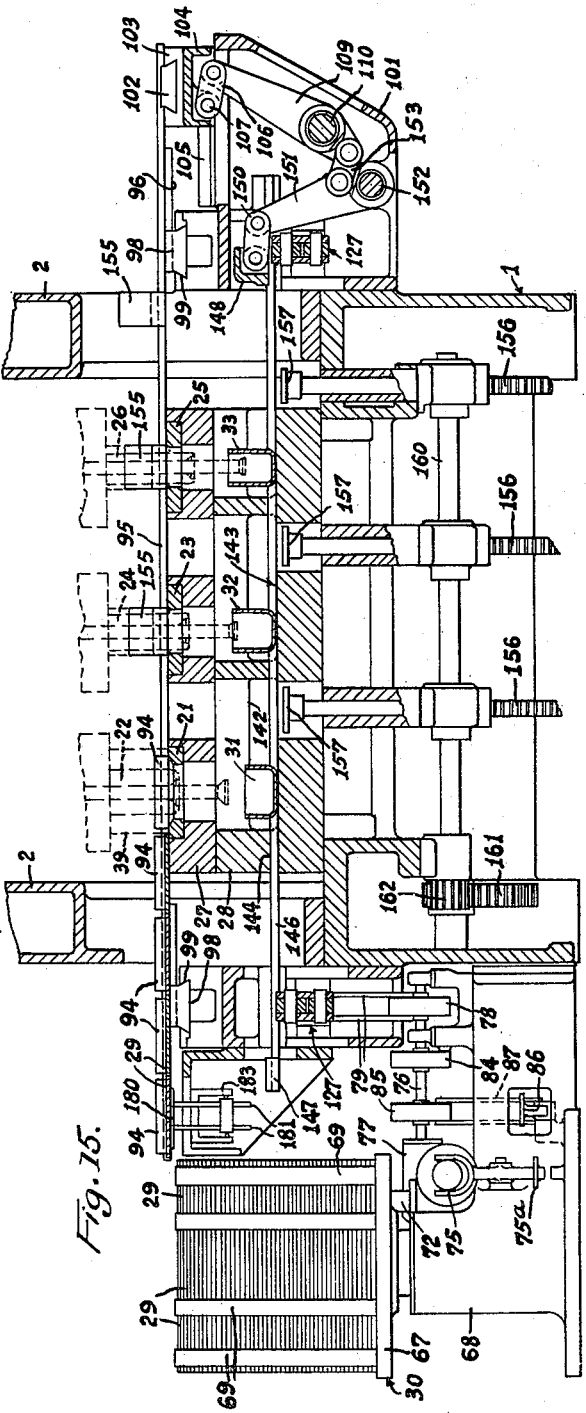
INVENTOR
WILLIAM F. LONGFIELD
BY *Chas. H. Trotter*
ATTORNEY

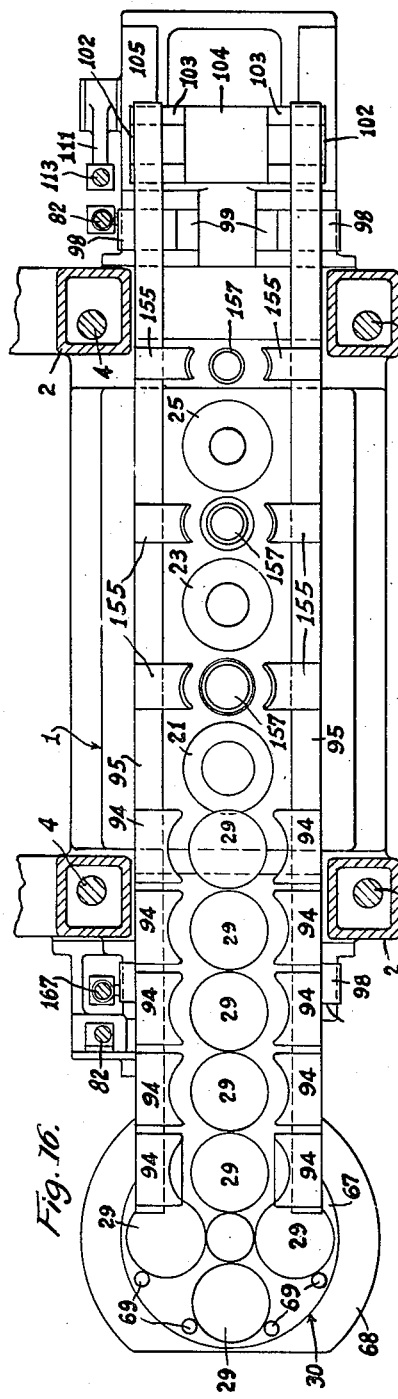
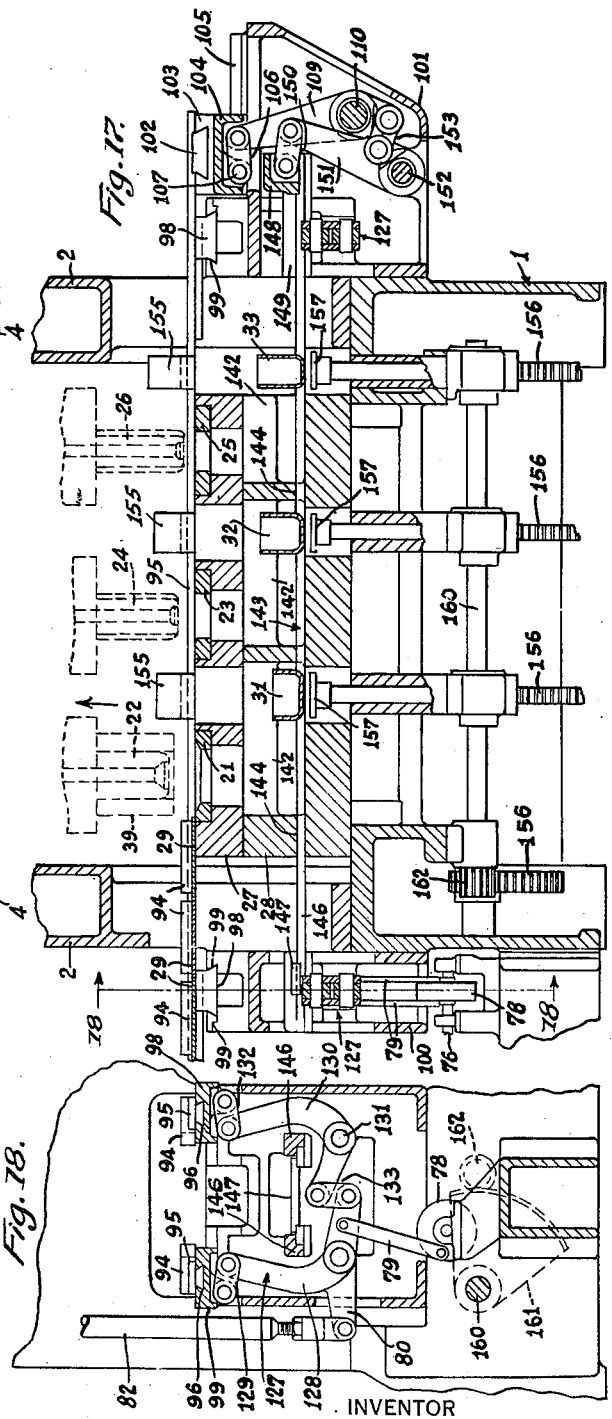

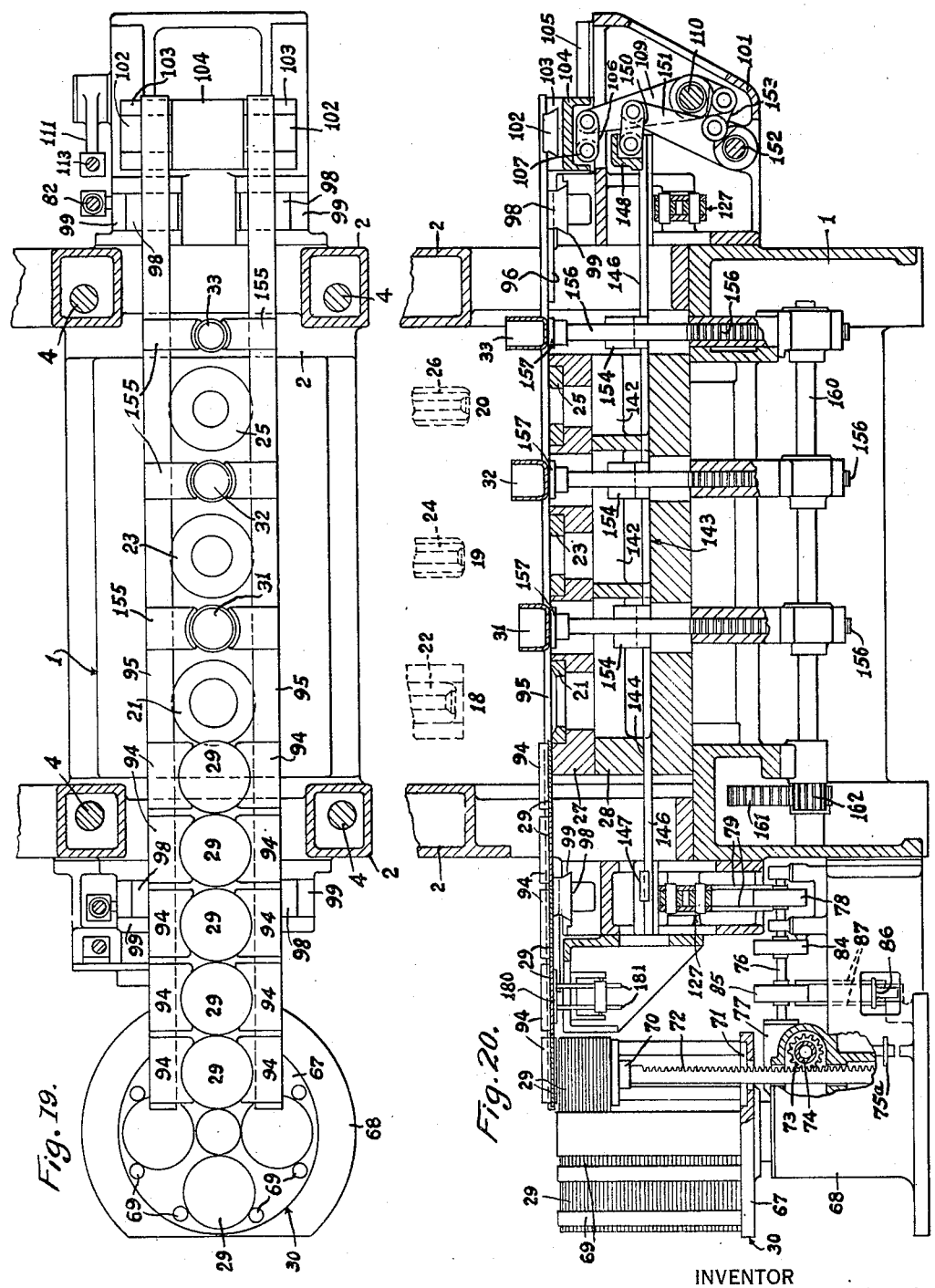

Patented May 19, 1942

2,283,505

UNITED STATES PATENT OFFICE 2,283,505

METALWORKING PRESS

William F. Longfield, Cleveland, Ohio, assignor to The Cleveland Punch & Shear Works Company, Cleveland, Ohio, a corporation of Ohio Application August 2, 1940, Serial No. 349,871

10 Claims. (Cl. 113—38)

This invention relates generally to sheet metal working presses, and more specifically to metal drawing presses equipped with die mechanism comprising a plurality of different dies for progressively performing different operations upon a blank.

The principal object of the invention is the provision in a press of this character of improved automatic means, operated by the crankshaft of the press, for receiving preformed blanks from a magazine or loading station and feeding them into the die mechanism, and then transferring them from one die to the next succeeding die in the die mechanism, in timed relation to the operation of the press.

Another object of the invention is the provision of a device of this character which is simple and efficient in operation, and which can be readily adjusted to different sizes and types of work.

Other and more specific objects of the invention will be apparent from the following specification and the accompanying drawings forming a part thereof wherein:

Figure 3 is a central vertical section taken substantially on the line 3—3 of Figure 1, showing the die slide and the parts carried thereby in their uppermost positions;

Figure 4 is a fragmentary horizontal section taken on the line 4—4 of Figure 3;

Figure 7 is a sectional side elevation, with a portion of the gear and cam housing removed, taken substantially on the line 7—7 of Figure 1;

Figure 8 is a fragmentary sectional rear elevation taken on the line 8—8 of Figure 7;

Figure 11 is an enlarged horizontal section taken on the line 11—11 of Figure 1 showing the various parts of the automatic feeding mechanism in the position they assume when the slide is in its uppermost position as shown in Figures 1 and 3;

Figure 12 is a central vertical section taken on the line 12—12 of Figure 11, the position of the upper or movable die members being shown in dotted lines;

Figure 13 is a transverse section taken on the line 13—13 of Figure 12 showing the construction of the mechanism for moving the blank feeding mechanism transversely of the press, the front and rear sections being simultaneously moved toward and away from each other;

Figure 14 is a view similar to Figure 11 showing parts of the feeding and transfer mechanism in the position they assume after the slide has completed its drawing or forming stroke and has partially completed its return stroke, being in the position shown in Figure 6;

Figure 15 is a view similar to Figure 12 with the various parts being in the same position as shown in Figure 14, and the position of the movable die members being shown in dotted lines;

Figure 16 is a view similar to Figure 11 showing parts of the feeding and transfer mechanism in the positions they assume after the die slide has completed its forming stroke and has practically completed its return stroke, having moved on beyond the position shown in Figures 6, 14 and 15;

Figure 17 is a view similar to Figures 12 and 15 with the various parts being in the same position as shown in Figure 16, and the position of the movable die members being shown in dotted lines;

Figure 18 is a transverse sectional view similar to Figure 13 showing the parts in a different position, and is taken on the line 18—18 of Figure 17;

Figure 19 is a view similar to Figures 11, 14 and 16 showing parts of the feeding and transfer mechanism in the position they assume just before the slide starts its down or forming stroke;

Figure 20 is a view similar to Figures 12, 15 and 17 with various parts being in the position shown in Figure 19, and the position of the movable die members being shown in dotted lines;

Figures 1, 2:
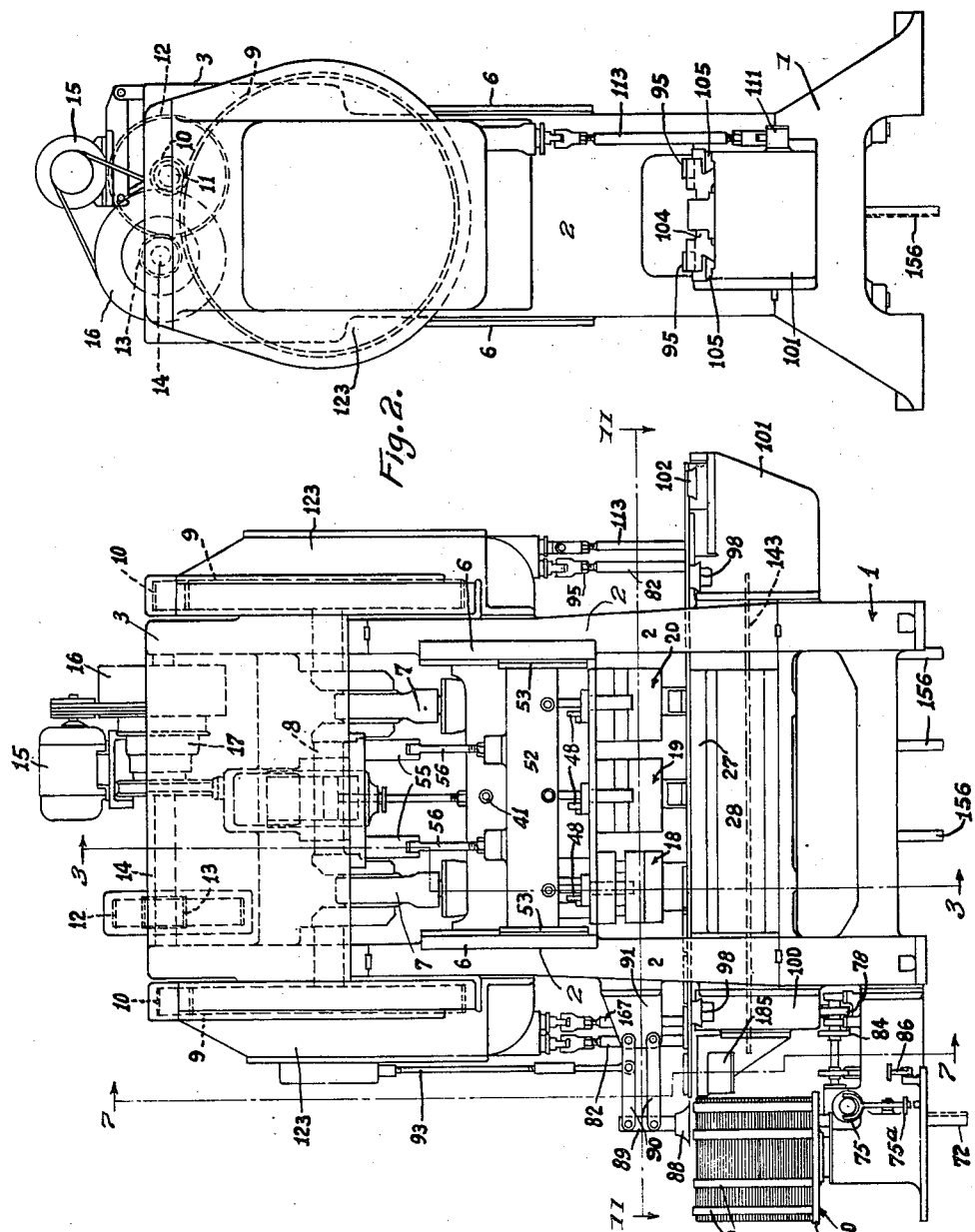
Figure 1 is a front elevation of a sheet metal working press embodying my invention.
Figure 2 is a side elevation thereof looking from the right of Figure 1.

My invention as illustrated herein embodies a sheet metal working press of conventional design in which is mounted a die mechanism consisting of a plurality of dies for successively performing different operations upon a blank; an hydraulic blankholder operatively associated with the die which performs the first operation; a stripping mechanism which strips the stampings from the movable parts of the various dies and forces them down through and out of the stationary parts of the several dies; and means for feeding blanks from a magazine into the die mechanism and for transferring the stamping from one die to the next succeeding die. The die mechanism, blankholder, stripping mechanism, and the feeding and transfer mechanism are all co-related and are operated in timed relation to each other from the crankshaft of the press.

The press includes a bed 1, and a pair of uprights 2 extending upwardly therefrom which support a crown 3 on their upper ends; the base, uprights and crown all being rigidly secured together by tie-rods 4 as is standard practice in presses of this character. A die carrying slide 5 is reciprocally mounted between the uprights 2 by suitable gibs 6, and is reciprocated through connecting rods 7 by a crankshaft 8 rotatably mounted in the crown 3. The crankshaft 8 is rotated through a pair of bull gears 9, one of which is secured to each end thereof. The bull gears 9 mesh with pinion gears 10 secured to opposite ends of a back shaft 11. The back shaft 11 has keyed thereto intermediate its ends a gear 12 which meshes with a pinion 13 on a second back shaft 14, which is driven by a motor 15 and flywheel 16 through a suitable clutch 17.

A die mechanism for drawing deep cups of relatively small diameter from preformed flat sheet metal discs is suitably mounted in the press, the stationary parts of the die mechanism being secured to the bed 1 and the movable parts thereof being secured to the reciprocal die slide 5. In drawing cups of this kind from flat sheet metal discs there is a limit to which the diameter can be reduced in one operation. Consequently, in order to draw relatively deep cups of small diameter from a flat disc it is necessary to do it in several operations, the number of operations depending on the diameter and depth of the cup. The die mechanism illustrated herein performs three successive operations, the first operation forming a cup from a flat disc and each succeeding operation reducing the diameter of the cup and increasing the depth thereof. After the die mechanism has once become loaded the three operations will be performed simultaneously on different blanks, by each stroke of the press, mechanism being provided for automatically feeding discs from a magazine to the first station and for transferring partially formed cups from one station to the next succeeding station in timed relation to the strokes of the press.

The die mechanism as a whole comprises three sets of dies 18, 19 and 20. The die 18 consists of a stationary part 21 and a cooperating movable part 22; the die 19 consists of a stationary part 23 and a co-operating movable part 24 and the die 20 consists of a stationary part 25 and a co-operating movable part 26. The stationary parts 21, 23 and 25 are carried by a plate 27 which is secured to a die support 28 bolted to the bed 1 of the press, and the movable parts 22, 24 and 26 are securely fastened to the under side of the slide 5 in alignment with the stationary parts 22, 23 and 25 respectively. The die 18 receives the discs 29 from the magazine 30 and forms cups 31. The cups 31 are then transferred to the die 19 which forms cups 32 of smaller diameter and greater depth therefrom. The cups 32 in turn are transferred from the die 19 to the die 20 which forms the finished cups 33 of still lesser diameter and greater depth. The feeding and transfer mechanism for feeding the discs from the magazine to the die 18 and for transferring the stamping from the die 18 to the die 19 and removing the finished cups or stampings 33 from the die 20 will be described in detail hereinafter.

In drawing cups from flat sheet metal blanks it is necessary to hold the edges of the blanks with a certain definite pressure, which is dependent upon the design of the cup being drawn and the material used, while the cup is being drawn; otherwise the sides of the cup will be wrinkled. In reducing the diameter and increasing the depth of a cup, however, a blank holder is not necessary as the two operations are entirely different. I have therefore, provided a blankholder, generally indicated by the number 34, which operates in conjunction with the die 18.

The blankholder 34 which is of the hydraulic type, it built into the die slide 5 and is operated, in proper timed relation to the die 18, by the reciprocation of the die slide. It includes a plate 35 which is connected by connecting rods 36 to four pistons 37 which are reciprocally mounted in cylinders 38 in the die slide 5. Removably secured to the lower face of the plate 35 is a blank engaging member 39, which surrounds the movable member 22 of the die 18 and is shaped according to the particular design of the cup being drawn. As will be seen in Figure 3 the blank engaging member 39 extends down beyond the lower end of the movable die member 22 when the die slide 5 is in its raised position, that is at the beginning of the down stroke. An oil reservoir 40, in the form of an airtight chamber, is provided in the die slide 5 adjacent the cylinders 38. Air under any desired pressure is admitted to and maintained in the chamber 40 on top of the oil therein, through a connection 41. The air pressure in the chamber 40 will force oil through the check valves 42 and passageways 43 into the cylinders 38 on top of the pistons 37 therein. As the pistons 37 are moved upwardly in the cylinders 38 during the drawing operation, as will be presently described, they will force oil out of the cylinders 38 through the passageways 43 and relief valves 44 and into the chamber 40. The relief valves 44 may be set to open, at any desired pressure, which will determine the resistance to the upward movement of the piston 37 and all parts connected thereto. From this it will be apparent that the setting of the relief valves 44 will determine the pressure exerted by the blankholder upon the blanks during the drawing operation. The check valves 42 and relief valves 44 are of standard construction, and since there are a number of different designs available, any one of which may be used equally well, it is believed that it is not necessary to illustrate or describe them in detail here.

Figure 5:
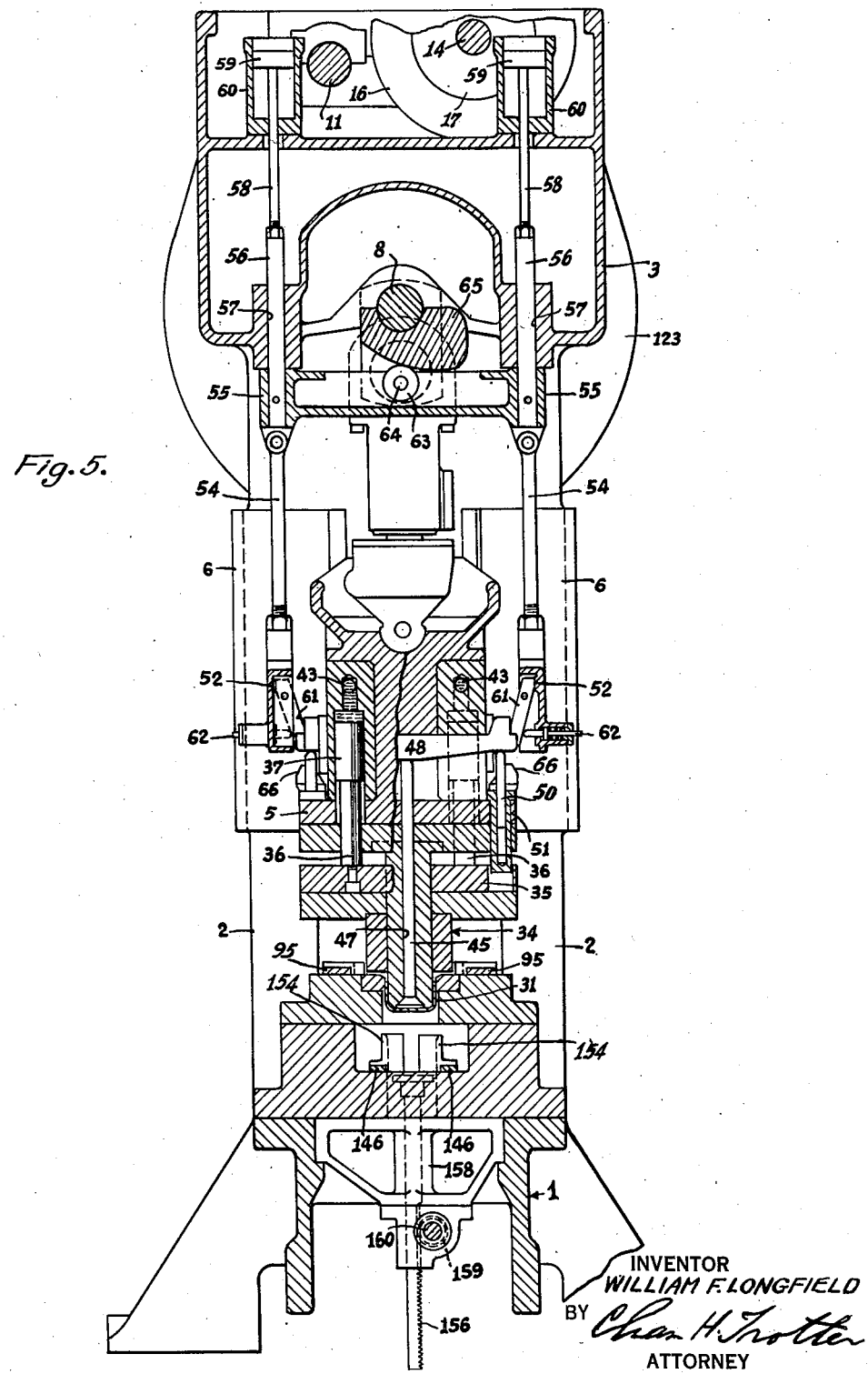
Figure 5 is a view similar to Figure 3, showing the die slide and the dies carried thereby in their lowermost position, that is at the end of the forming stroke.

The operation of the blankholder 34 and dies 18, 19 and 20 will now be described. Let us assume that the slide 5 and the various other parts are in the position shown in Figure 3, and that a blank is in position in the die 18 and that the partially completed cups 31 and 32 are in position in the dies 19 and 20 as shown in Figure 12. The clutch 17 is engaged, which will rotate the crankshaft 8 through the reduction gearing described hereinbefore. The operation of the clutch 17 is controlled by a suitable standard control mechanism not shown. Each rotation of the crankshaft 8 will reciprocate the die slide 5 from the position shown in Figure 3, down to the position shown in Figure 4 and back to the position shown in Figure 3. The downward movement of the die slide 5 will first bring the blank engaging member 39 of the blankholder 34 into engagement with the blank 29. The blankholder will then dwell and hold the edges of the blank 29 with the predetermined pressure, dependent upon the setting of the relief valves 44, while the die slide 5 and the movable parts 22, 24 and 26 of the dies 18, 19 and 20 continue on downwardly, the die 18 drawing the cup 31 from the blank 29, the die 19 drawing the cup 32 from the cup 31, and the die 20 drawing the finished cup 33 from the cup 32. Due to the blank engaging member 39 extending down below the bottom of the movable die member 22 it will engage and hold the blank 29 with the desired pressure before the die member 22 comes into engagement with the blank 29, to draw the cup 31 by forcing the blank 29 down through the stationary part 21 as shown in Figure 5. The continued downward movement of the die slide 5 after the blankholder 34 has engaged the blank 29 will cause a relative upward movement of the pistons 37 in the cylinders 38 forcing oil out through the relief valves 33 into the chamber 40. After the blankholder has engaged the blank 29 it will remain stationary until the die slide 5 has completed its downward movement and has moved upwardly a distance equal to the distance it moved downwardly after the blankholder engaged the blank 29. The blankholder will remain stationary during this initial upward movement of the slide, due to oil being forced from the chamber 40, by the air pressure therein, through the check valves 42 and passageways 43 into the cylinders 38 on top of the pistons 37, until the lower ends of the pistons 37 engage the cylinder heads and then the blankholder and die slide will move upwardly as a unit during the remainder of the upward movement of the slide.

In drawing cups of this character with dies of the type shown there is a tendency for the cups or stamping to adhere to the movable die members. With most metal working apparatus of this type it is customary to provide some means for stripping the cups or stamping from the movable die members. This stripping mechanism is usually carried by the slide and arranged to strip the stamping from the movable die member at or near the upper end of the press stroke. I have provided an improved stripping means which is carried by and operated by the reciprocation of the slide and which is arranged to strip the stamping from the movable die member and force it out of the stationary die member at or near the bottom of the stroke. This type of stripping mechanism is particularly advantageous for use with automatic feeding and transfer mechanisms used in combination with a plurality of dies mounted in a press for simultaneously performing a plurality of different operations. It is also especially useful when automatic mechanism is provided for discharging finished stamping from a press.

My improved form of stripping mechanism will now be described. It consists generally of a plunger, which is normally urged upwardly by air pressure, slidably mounted in a vertical bore in each of the movable parts 22, 24 and 26 of the dies 18, 19 and 20 and means, operated by the crankshaft, for depressing the plungers, within their respective bores, in timed relation to the reciprocation of the die slide 5. Each plunger 45 has an enlarged head 46 and is slidably mounted in a vertical bore 47 in the movable die members 22, 24 and 27. The upper ends of the plungers 45 are connected to cross bar 48 which are slidably mounted in transverse slots 49 in the die slide 5. The cross bars 48 are normally held at the top of the slots 49, in the position shown in Figures 3 and 5, by air operated pistons 50, slidably mounted in cylinders 51 in alignment with the cross bars 48 near each end thereof. Compressed air is supplied to the cylinders 51 beneath the pistons 50 by suitable flexible connections not shown. A pair of slides 52 extending lengthwise of the press parallel to the die slide 5, one in front thereof and one in the rear thereof are mounted for vertical movement in guides 53 formed on or secured to the gibs 6. The slides 52 are each adjustably connected by rods 54 to a pair of spaced parallel transversely extending cross bars 55, and the cross bars 55 are each secured to the lower ends of a co-operating pair of rods 56 slidably mounted in vertical bores 57 in the crown of the press. Each of the rods 57 has secured thereto by an adjustable extension 58 a piston 59 which is slidably mounted in a co-operating cylinder 60. Air under pressure which is constantly supplied to the cylinder 60 beneath the pistons 59 by suitable connections not shown, urges the pistons 59 upwardly and normally holds the cross bars 55 and the slides 52 connected thereto up in the position shown in Figures 3 and 5.

Each of the slides 52 has a latch 61 pivotally mounted in alignment with each of the three cross bars 48. These latches 61 are biased toward the die silde 5 by spring pressed plungers 62. Each cross bar 55 has a roller 63 mounted thereon on a short shaft 64 which is carried thereby. The rollers 63 are adapted to be engaged by co-operating cams 65 which are rigidly secured to the crankshaft 8 in operative relation to the rollers 63.

Figure 6:
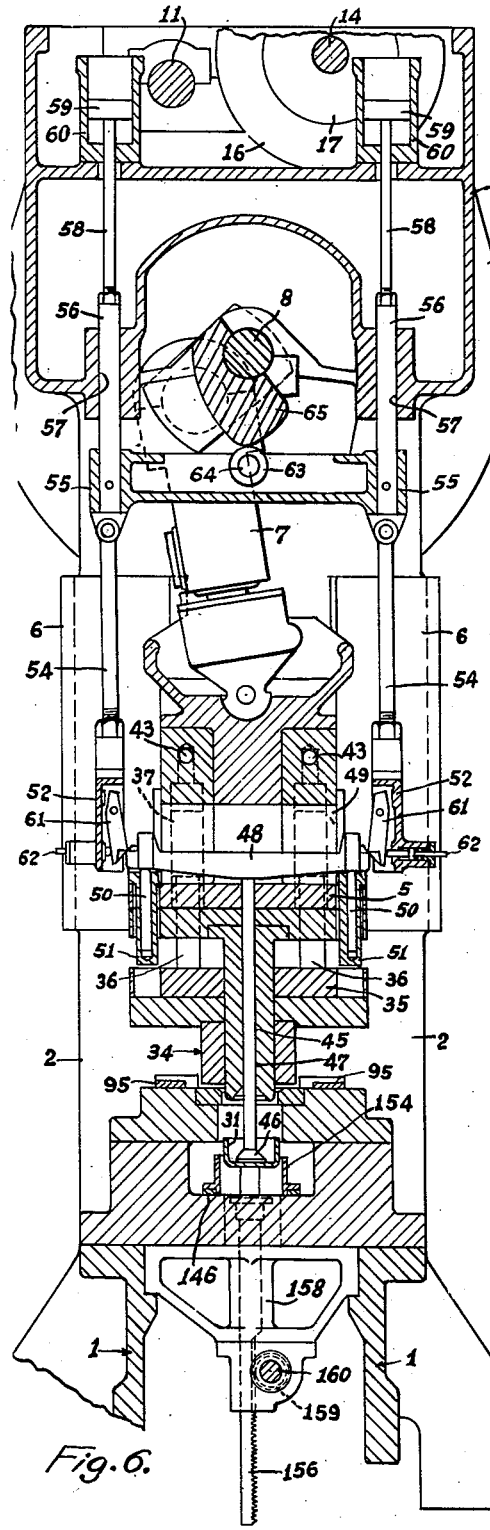
Figure 6 is a view similar to Figures 3 and 5 showing the various parts in the positions they assume after the die slide has completed its downstroke and has moved part way back to its initial position, shown in Figure 3.
Figure 21:
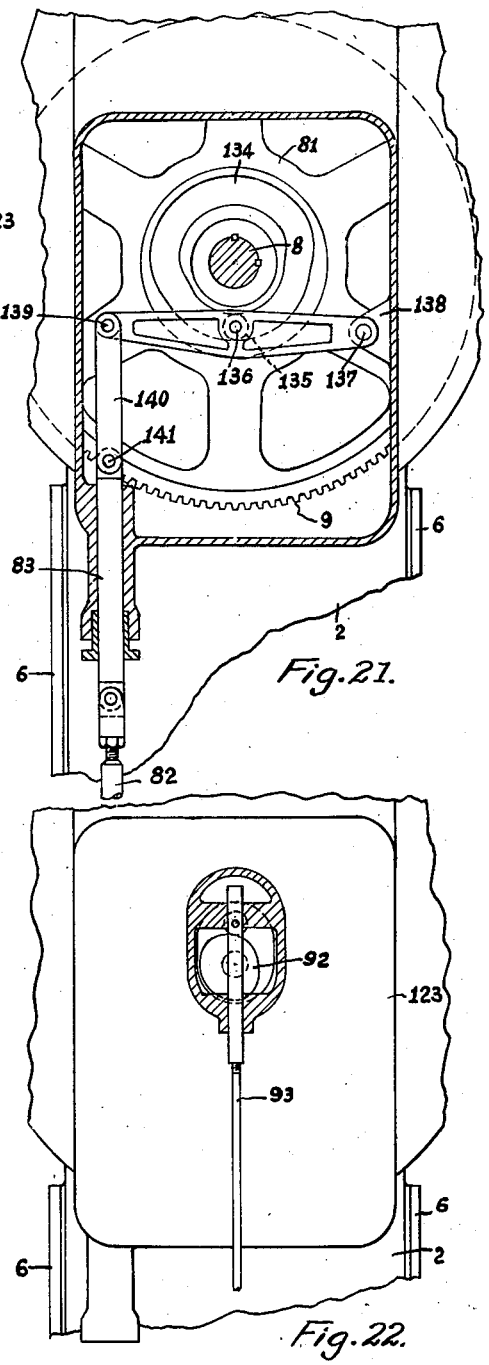
Figure 21 is a detail section taken on the line 21—21 of Figure 8 showing the cam and operating levers for operating the mechanism shown in Figures 13 and 18.

The operation of the stripping device is as follows. The crankshaft being rotated in a clockwise direction, as previously described, will move the die slide 5 from its uppermost position shown in Figure 3, which is the top of the stroke, down to its lowermost position, the bottom of the stroke, as shown in Figure 5 and the dies 18, 19 and 20 will perform their respective operations upon the stock therein. The downward movement of the die slide 5 will also carry the cross bars 48 downwardly until they are engaged by the spring pressed latches 61, which occurs just at the bottom of the stroke, when the slides 52 which carry the latches 61 are properly adjusted; and the cams 65 are so constructed and arranged that they will just come into contact with the rollers 63 at the bottom of the stroke as is shown in Figure 4. The continued rotation of the crankshaft in a clockwise direction will cause the cams 65 to depress the cross bars 55 which in turn will depress the slides 52. The depression of the slides 52 will in turn, through the latches 81, depress the cross bars 48 and they in turn will force the plungers 45 downwardly stripping the stamping off the movable parts of the dies and forcing them down out of the stationary parts of the dies as is shown in Figure 6. The continued rotation of the crankshaft will move the cams 65 out of engagement with the rollers 63 and will move the die slide 5 upwardly bringing cams 66 carried thereby into engagement with the latches 61. The cams 66 will release the latches 61 from the cross bars 48 and allow the air operated pistons 59 to return the cross bars 55 and slides 52 back to their initial positions as shown in Figure 3.

Having described the construction and operation of the press, die mechanism, blankholder and stripping mechanism I will now describe in detail the construction and operation of the feeding and transfer mechanism and its relation to the various other mechanisms just described.

It consists generally of a magazine, in which a large number of preformed blanks are placed, having means for moving successive blanks into position to be engaged by a suction cup which lifts the blanks out of the magazine into position to be fed into the die mechanism; an upper conveyor which includes a pair of spaced parallel bars which are moved toward and away from each other to grasp and release the blanks and stampings and which are longitudinally shifted to feed a blank to the first die in the die mechanism and to simultaneously transfer stampings from a position between adjacent dies into operative position in the next successive die; a second conveyor, below the first conveyor which receives the stampings as they are forced out of the stationary part of the dies by the stripping mechanism and transfers them to a position between adjacent dies; elevator mechanism which lifts the stampings up from the lower conveyor into position to be engaged by the upper conveyor; and means for operating the various parts in timed relation to each other.

The magazine 30 includes a base 67, which is rotatably supported upon an extension 68 of the bed 1 of the press. A plurality of rods 69 which are secured to and extend upwardly from the base 67 form four compartments in which the preformed blanks or discs 29 are stacked. A support 70 is loosely mounted in each of the compartments in recesses 71 in the base 67. The supports 70 are adapted to be successively engaged by a rack 72 as the compartments are rotated into register therewith when the rack is in its retracted position. The rack 72 raises the support 70, and the blanks 29 supported therefrom, the thickness of one blank for every stroke of the press. The rack 72 is raised by a gear 73, meshing therewith, which is clutched to a shaft 74 by a clutch 75. The shaft 74 and gear 73 are rotated from a shaft 76 through suitable connecting gears in a case 77, and the shaft 76 is rotated through a one way clutch 78 by links 79 which are connected to a pivoted lever 80 which is oscillated by a cam 81, secured to one end of the crankshaft 8, through a connected rod 82 and slide 83. A one way clutch 84 similar to the clutch 78 but operating in the opposite direction is provided to keep the shaft 76 from being rotated in the opposite direction by the weight of the blanks 29 acting through the rack 72 and gear 73. In order that the supports 70 may be raised manually so as to bring the top of each stack of blanks 29, supported thereupon, to the proper height before starting the press I provide a one way clutch 85, similar to and working in the same direction as the clutch 78, which is operated by a treadle 86 through links 87. This renders it unnecessary to always fill the compartments of the magazine with blanks before starting operation. It also renders it possible to run through any desired number of blanks. After all of the blanks in a compartment have been used the rack 72 is lowered down below the base 67, by disengaging the clutch 75 which may be done by a treadle 75ª provided for this purpose, and then the magazine 30 is rotated manually to bring the next compartment into register with the rack 72. The rack itself prevents rotation of the magazine when the rack is in operative position in engagement with one of the supports 70 as shown in Figure 20. In order to rotate the magazine the rack must first be retracted down below the bottom of the base 67 which lowers the support 70 thereon down into the recess 71 where the rack leaves it.

Figure 22:
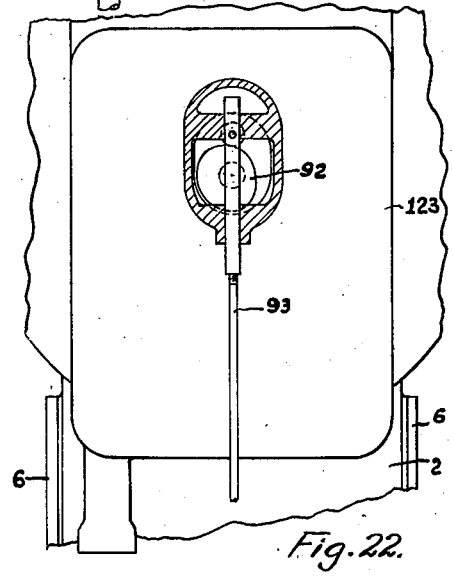
Figure 22 is a detail sectional view illustrating the construction of the cam for operating the suction cup which lifts the blanks from the magazine or loading station into position to be received by the feeding and transfer mechanism.
Figures 9, 10:
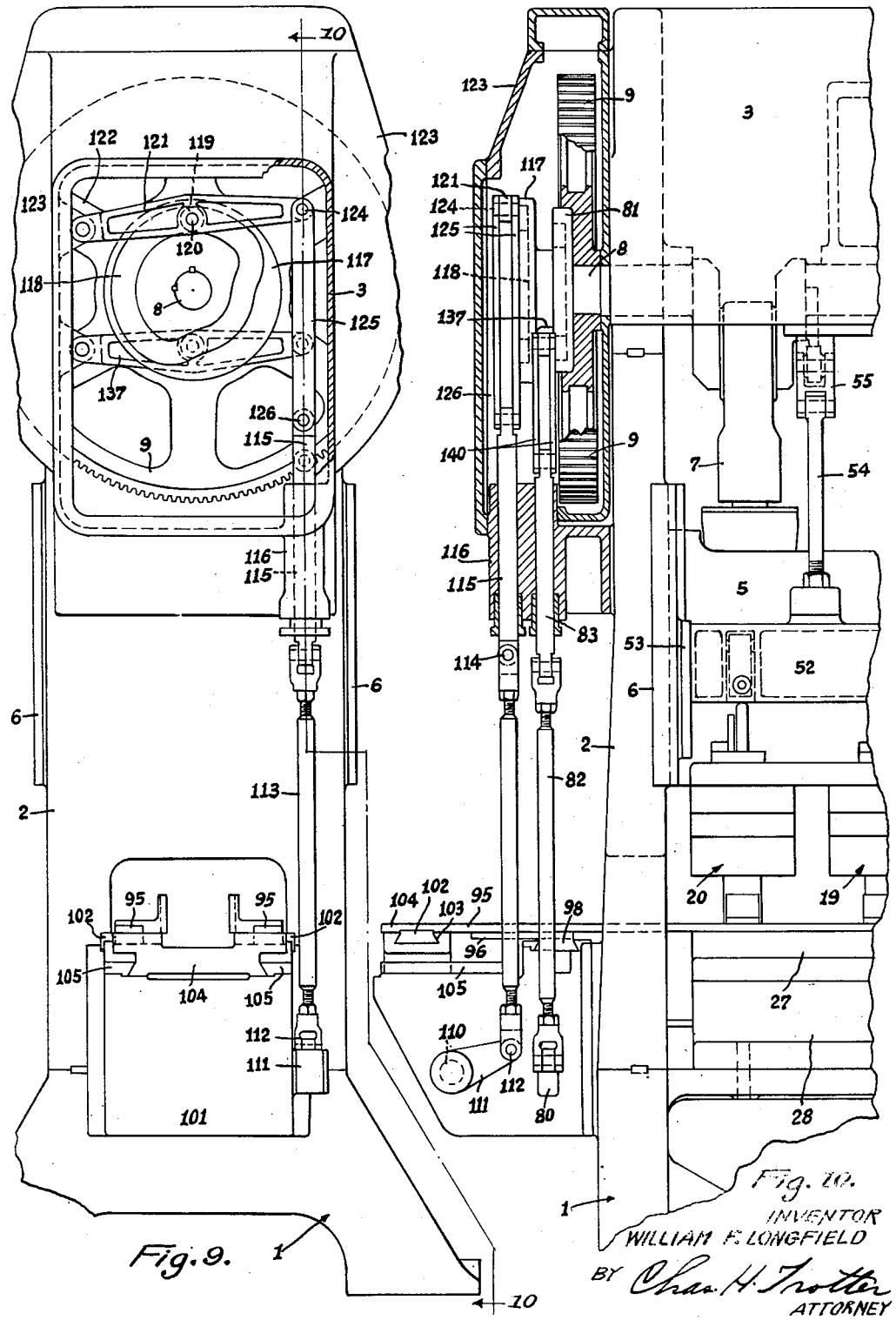
Figure 9 is an enlarged view similar to Figure 2, with parts broken away and part of the gear and cam housing removed.
Figure 10 is a fragmentary sectional rear elevation, taken substantially on the line 10—10 of Figure 9.

As the blanks 29 are raised by the rack 72 the top blank of the stack is engaged by a suction cup 88 and raised into position to be grasped by the upper conveyor which feeds the blanks into operative position in the first die of the die mechanism. The suction cup 88 is secured to the lower end of a member 89 which is pivotally secured to the outer ends of a pair of parallel links 90 which have their inner ends pivotally secured to a bracket 91 extending outwardly from one of the uprights 2. The suction cup 88 is raised and lowered in proper timed relation to the rest of the apparatus by a cam 92, Figures 8 and 22 secured to one end of the crankshaft 8. The cam 92 is operatively connected by an adjustable rod 93 to one of the parallel links 90 and raises and lowers the suction cup 88 once for every stroke of the press.

As each blank is raised from the magazine 30 by the suction cup 88 it is grasped between the first of a plurality of pairs of grips 94 secured to transversely and longitudinally movable bars 95. The bars 95 each have an elongated lug 96 secured to the under side thereof near each end thereof. These lugs are slidably received for longitudinal movement in dovetail grooves 97 in blocks 98 which are slidably mounted for transverse movement in dovetail grooves 99 formed in supports 100 and 101 secured to and extending outwardly from opposite sides of the press. With this construction the bars 95 can be moved both transversely and longitudinally, by mechanism which will now be described.

The ends of the bars 95 opposite the magazine 30 each have secured to the under side thereof a block 102 which is slidably received for transverse movement in a dovetail groove 103 formed in the upper part of a slide 104 which is mounted for longitudinal movement on the upper surface of the support 101 between guides 105. A link 106 has one end thereof pivotally connected to the under side of the slide 104, as indicated at 107. The other end of the link 107 is pivoted at 108 to the upper end of a lever 109 which is keyed to a transversely extending shaft 110 rotatably supported in suitable bearing in the support 101. An arm 111 is rigidly secured to one end of the shaft 110. The outer end of the arm 111 is pivoted at 112 to the lower end of an adjustable connecting rod 113 which has its upper end pivotally connected at 114 to the lower end of a vertical slide 115 suitably mounted in a guide 116. The slide 115 is reciprocated up and down in the guide 116, with a long dwell in its up position, by a cam 117 secured to one end of the crankshaft 8 and having a cam track 118 formed in the face thereof in which is received a roller 119 rotatably mounted on a stud 120 secured to the central section of a lever 121 which has one end thereof pivotally connected to a lug 122 formed integral with the cam and gear casing 123. The other end of the lever 121 is pivotally connected at 124 to the upper ends of links 125 which have their lower ends pivotally connected at 126 to the upper end of the slide 115. From the foregoing it will be readily seen that as the cam 117 is rotated it will reciprocate the slide 115 which will in turn oscillate the shaft 110 through the connecting rod 113 and arm 111. The shaft 110 when oscillated will through the lever 109 and link 106 move the slide 104 and the bars 95 connected thereto back and forth longitudinally of the press, with a long dwell at one end of their movement, which is the position shown in Figures 11, 12, 14 and 15, and a short dwell at the other end of their movement, when they are in the position shown in Figures 16, 17, 19 and 20. The long dwell is during approximately 180 degrees rotation of the cam 117 and the short dwell is during approximately 60 degrees rotation of the cam 117, which is due to the contour of the cam track 118.

During the dwells in the longitudinal movement of the bars 95 they are moved toward and away from each other transversely of the press by duplicate mechanisms at each end of the press, which are generally indicated by the numeral 127. The bars 95 are moved away from each other, from the position shown in Figure 11 to the position shown in Figure 14, during the long dwell; and toward each other, from the position shown in Figure 16 to the position shown in Figure 19 during the short dwell.

The mechanisms 127 are illustrated in detail in Figures 13 and 18, Figure 13 showing the various parts in the position they assume after having moved the bars 95 toward each other to the position shown in Figures 11 and 19; and Figure 18 showing the parts in the position they assume after having moved the bars away from each other to the position shown in Figures 14 and 16. Since the mechanisms 127 at both ends of the press are duplicates of each other a description of one will suffice for both. They are operated by the cams 81, through the slides 83, connecting rods 82 and levers 80, previously referred to in connection with the description of the magazine and the mechanism for raising the stacks of blanks therein. An arcuate shaped arm 128 which is rigidly secured to the lever 80 is connected by a short link 129 to one of the blocks 98. A bell crank lever 130 pivotally supported at 131 has one arm thereof connected to another of the blocks 98 by a short connecting link 132, and the other arm thereof connected to the lever 80 by a short connecting link 133.

The cam 81 has a cam track 134 formed in the face thereof in which is received a roller 135 rotatably mounted on a stud 136 secured to the central section of a lever 137 which has one end pivotally connected to a lug 138 formed integral with the cam and gear casing 123. The other end of the lever 137 is pivotally connected at 139 to the upper ends of links 140 which have their lower ends pivotally connected at 141 to the upper end of the slide 83. The cam track 134 is so shaped that it reciprocates the slide 83 with a dwell in both its lowermost and uppermost positions during approximately 120 degrees rotation of the cam 81. From the foregoing it will be apparent that as the cam 81 rotates it will reciprocate the slide 83 which will in turn rock the lever 80 back and forth upon its pivot. The lever 80 when it is rocked back and forth will oscillate the arms 128 and 130 to move the bars 95 toward and away from each other with a dwell at the limits of their movement in both directions. The cams 81 are so set with respect to the cams 117 that the bars 95 will be moved transversely of the press during the dwells in their longitudinal movement.

The cycle of movement of the bars 95 is first to the position shown in Figure 11 where the long dwell in their longitudinal movement takes place. During this dwell they are moved transversely away from each other to the position shown in Figure 14 where they dwell during approximately 120 degrees rotation of the crankshaft. During this transverse dwell they are moved longitudinally to the position shown in Figure 16, where the short dwell in their longitudinal movement occurs. During this short dwell in the longitudinal movement of the bars 95 they are moved transversely toward each other to the position shown in Figure 19 bringing the first pair of grips 94 thereon into engagement with a blank 29 held in position by the suction cup 88. After the bars 95 have been moved to this position there is another dwell in their transverse movement during which they are moved longitudinally in the reverse direction back to the position shown in Figure 11, bringing the blank held in the last pair of grips 94 into position in the die 18. After five cycles of operation of the bars 95, or five strokes of the press, the bars 95 moving through one complete cycle for every complete stroke of the press, there will be a blank 29 held in each pair of grips 94. After that a blank 29 will be fed into the die 18 after each down stroke of the die slide 5, the blanks being fed progressively through succeeding pairs of grips 94.

The die support 28 is recessed beneath each of the dies 18, 19 and 20 as indicated at 142. A lower conveyor generally indicated by the numeral 143 is slidably mounted, for longitudinal movement only, in guides 144 in the die support 28 and extends through the recesses 142. The conveyor 143 consists of a pair of spaced parallel longitudinally extending bars 140 which are joined together at one end by a cross bar 147, and at their other end by a slide 148 mounted between guides 149 in the support 101. The slide 148 is connected by a short link 150 to the upper end of a lever 151 which is rotatably supported on a stud shaft 152 secured within the support 101. The lever 151 is connected by a short link 153 to the lower end of the lever 109 below the shaft 110 as shown in Figures 12 and 17. As the shaft 110 is rocked or oscillated by the cam 117, as hereinbefore described, the conveyor 143 will be reciprocated back and forth between the position shown in Figure 12 and the position shown in Figure 17. The upper conveyor and the lower conveyor 143 will be moved simultaneously, the lower conveyor moving to the left while the upper conveyor is moving to the right and vice versa; and since both conveyors are moved longitudinally by the cam 117 they will both have the same dwells in their movements.

After the cups 31, 32 and 33 have been formed by the down stroke of the press and the stripping mechanism has operated to strip the cups from the movable parts of the dies and force them down through and out of the stationary parts of the dies to the position shown in Figure 15 they are received between co-operating grips 154 on the conveyor bars 146 and moved from the position shown in Figure 15 to the position shown in Figure 17, where they are engaged by an elevator mechanism which lifts them from the position shown in Figure 17 to the position shown in Figure 20. After the cups have been raised to the position shown in Figure 20 they are engaged by the upper conveyor, between opposed co-operating grips 155 on the bars 95, and moved to the position shown in Figure 12, ready for the next operation.

The elevator mechanism which will now be described includes three aligned racks 156, each of which has an enlarged cup engaging and supporting head 157 secured to the upper end thereof. The racks 156 are slidably supported in guides 158 and are raised and lowered, in timed relation to the operation of the upper and lower conveyors, by co-operating gears 159 keyed to a shaft 160. The shaft 160 is rotated in first one direction and then the other by a segmental gear 161 which meshes with a pinion gear 162 keyed to one end of the shaft 160. The segmental gear 161 is keyed to a shaft 163 which is rocked back and forth by the reciprocation of a rack 164 which meshes with a segmental gear 165 also keyed to the shaft 163. The rack 164 is suitably supported in a guide 166, and is connected at its upper end to the lower end of an adjustable connecting rod 167 which has its' upper end pivotly connected at 168 to the lower end of a vertical slide 169 suitably mounted in a guide 170. The slide 169 is reciprocated up and down in the guide 170, with a long dwell in its upper position and a short dwell in its lower position, by a cam 71 secured to one end of the crankshaft 8, which has a cam track 171 formed in the face thereof in which is received a roller 173 rotatably mounted on a stud 174 secured to the central section of a lever 175 which has one end thereof pivotly connected to a lug 176 formed integral with the cam and gear housing 123. The other end of the lever 175 is pivotly connected at 177 to the upper ends of links 178 which have their lower ends pivotly connected at 179 to the upper end of the slide 169. From the foregoing it will be seen that as the cam 171 rotates with the crankshaft 8 the racks 156 will be quickly raised and lowered and will dwell in their lowermost position, shown in Figures 15 and 17 during about 180 degrees rotation of the crankshaft and in their uppermost position, shown in Figures 12 and 20, during about 60 degrees rotation of the crankshaft.

The general operation of the whole mechanism will now be described, the specific operation of each of the component parts having been described in connection with the description of their construction. The magazine 30 is first loaded with blanks and then turned to bring one of the stacks of blanks therein into proper register with the rack 72. The rack 72 is manually raised by the treadle 86 to bring the top of the stack of blanks to the proper position with respect to the suction cup 88, and the whole apparatus is then put into operation by engaging the clutch 17. The upper conveyor will take blanks from the suction cup 88, which lifts them successively from the top of the stack thereunder, and feed them into the die 18, in proper timed relation to the stroke of the die slide 5, to be engaged first by the blankholder 34 and held thereby while the movable part 22 of the die 18 forces the blank into the stationary part 21 of the die forming the cup 31. The stripping mechanism then operates to strip the cup 31 off the movable part 22 of the die 18 and down through the stationary part 21 thereof onto the lower conveyor 143 as shown in Figure 15. The lower conveyor 143 then moves the cup 31 into position over the adjacent rack 156, as shown in Figure 18, which lifts the cup 31 up to the position shown in Figure 20 where it is engaged by the upper conveyor and moved into proper position in the die 19. The next stroke of the die slide forces the cup 31 down through the stationary part 23 of the die 19 forming the cup 32 which is stripped off of the movable part 24 of the die 19 and onto the lower conveyor 143, as shown in Figure 15. The lower conveyor then moves the cup 32 into position over the next rack 156 which raises the cup 32 into the position shown in Figure 12 where it is engaged by the upper conveyor and moved into position in the die 20. The next stroke of the die slide 5 forces the cup 32 down into the stationary part 25 of the die 20 forming the finished cup 33. The cup 33 is then stripped out of the die 20 and onto the lower conveyor 143 (Figure 15) which moves it into the position shown in Figure 18 where it is lifted by the rack 156 to the position shown in Figure 20 where it is engaged by the upper conveyor and moved partially out of the press to the position shown in Figure 12. After the whole apparatus has been completely loaded, the blanks 29 and the cups 31, 32 and 33 will all be operated upon simultaneously every stroke of the press, and one finished cup 33 will be completed on each stroke as will be readily understood.

As the blanks 29 are fed from the magazine 30 into the die mechanism they are moved through a weighing station which consists of a platform 180 secured to the upper ends of a pair of rods 181 which are adjustably secured to one end of a pivoted lever 182, pivotly supported at 183. A weight 184 is slidably mounted on the lever 182 adjacent the free end thereof. As the blanks are fed from the magazine 30 they are first deposited on the platform 180. The weight 184 is so adjusted that the platform will tilt, if more than one blank 29 is deposited thereon at one time, and discharge the blanks down a chute 185. This prevents more than one disc at a time being fed into the die mechanism.

It will be understood that various modifications can be made in the construction of my improved apparatus as illustrated and described herein without departing from the scope of the invention as pointed out in the following claims.

Having thus described my invention what I claim is:

1. A device of the character described which includes a die mechanism having a plurality of successive dies therein and means for operating said dies in combination with means for feeding blanks into said die mechanism and for transferring stampings from one die to the next succeeding die, said means comprising, an upper conveyor for receiving blanks from a magazine and feeding them into said die mechanism and for moving stampings from a position between successive dies into position in the next successive die, a lower conveyor for receiving stampings from one of said dies and moving them to a position between successive dies, elevator mechanism for elevating stampings from said lower conveyor into position to be engaged by said upper conveyor and means for operating said conveyors and said elevator mechanism in timed relation to each other and to said die mechanism.

2. A device for feeding blanks into a die mechanism and for transferring stampings from one die to the next succeeeding die in said die mechanism comprising, an upper conveyor for feeding blanks from a magazine into said die mechanism and for transferring stampings from a position between successive dies into the next successive die, a lower conveyor for receiving stampings from said dies and transferring them to a position between successive dies, an elevator mechanism for elevating the stampings from said lower conveyor into position to be engaged by said upper conveyor and means for operating said conveyors and said elevator in timed relation to each other.

3. In a device of the character described the combination of a plurality of successive dies and means for transferring stampings from one die to the next successive die said means comprising, a lower conveyor for receiving stampings from one of said dies and conveying them to a position adjacent the next successive die, elevator mechanism for raising said stampings from said lower conveyor, an upper conveyor for conveying said stampings from said elevator into positions in the next successive die, and means for operating said conveyors and said elevator in timed relation to each other.

4. In a device of the character described the combination of a press having a reciprocal die slide therein and a rotatable crankshaft for reciprocating said slide, a plurality of dies operatively mounted in said press and operated by the reciprocation of said die slide, means for feeding blanks into one of said dies and for transferring stampings from one die to the next successive die, said means comprising, an upper conveyor for receiving blanks from a magazine and feeding them into one of said dies and for moving stampings from a position between successive dies into position in the next successive die, a lower conveyor for receiving stampings from one of said dies and moving them to a position between successive dies, an elevator mechanism for elevating stampings from said lower conveyor into position to be engaged by the upper conveyor and means operated by said crankshaft for operating said conveyors and said elevator mechanism in timed relation to each other and to said slide.

5. A device for successively transferring stampings from one die to the next succeeding die for performing a plurality of successive operations upon a blank comprising in combination, a lower conveyor which receives stampings from the dies and transfers them to a position between successive dies, an upper conveyor which moves the stampings from a position between successive dies into operative position in the next successive die, means for elevating stampings from the lower conveyor into position to be engaged by said upper conveyor and means for operating said conveyors and said elevating means in timed relation to each other.

6. A device of the character described including a plurality of successive dies for successively performing different operations on a blank in combination with means for feeding blanks from a magazine into one of said dies and for transferring stampings from one die to the next successive die said means comprising, an upper conveyor for receiving blanks from a magazine and feeding them into one of said dies and for moving stampings from a position between successive dies into position in the next successive die, a lower conveyor for receiving stampings from one of said dies and moving them to a position between successive dies, an elevator mechanism for lifting stampings from said lower conveyor up into position to be engaged by said upper conveyor, and means for operating said conveyors and said elevator mechanism in timed relation to each other.

7. A device of the character described including a plurality of successive dies for successively performing a plurality of different operations on a blank in combination with means for successively transferring stampings from one die to the next successive die said means comprising, a lower conveyor for receiving stampings from one of said dies and moving them to a position between successive dies, an upper conveyor for moving said stampings from a position between successive dies into position in the next successive die, means for simultaneously reciprocating said conveyors longitudinally in opposite directions with a dwell at the limit of their movements in both directions, an elevator mechanism for lifting stampings from said lower conveyor up into position to be engaged by said upper conveyor, and means for operating said elevator mechanism during dwells in the longitudinal movements of said conveyors.

8. A device of the character described including a plurality of successive dies for successively performing a plurality of different operations on a blank in combination with means for successively transferring blanks from one die to the next successive die said means comprising, a lower conveyor for receiving stampings from one of said dies and moving them to a position between successive dies, an upper conveyor including a pair of spaced parallel members for moving said stampings from a position between successive dies into position in the next successive die, means for simultaneously reciprocating said members transversely in opposite directions with a dwell at the limits of their movements in both directions, means for simultaneously reciprocating said lower conveyor and said members longitudinally in opposite directions during dwells in the transverse movement of said members, an elevator mechanism for lifting stampings from said lower conveyor up into position to be engaged by the said members of said upper conveyor and means for operating said elevator mechanism in timed relation to the operation of said conveyors.

9. A device of the character described including a plurality of successive dies for successively performing a plurality of different operations on a blank in combination with means for successively transferring blanks from one die to the next successive die said means comprising, a lower conveyor for receiving stampings from one of said dies and moving them to a position between successive dies, an upper conveyor including a pair of spaced parallel members for moving said stampings from a position between successive dies into position in the next successive die, means for simultaneously reciprocating said lower conveyor and said members longitudinally in opposite directions with a dwell at the limits of their movements in both directions, means for reciprocating said members transversely during dwells in their longitudinal movement, an elevator mechanism for lifting stampings from said lower conveyor up into position to be engaged by said members, and means for operating said elevator mechanism in timed relation to the operation of said conveyors.

10. A device of the character described including a plurality of successive dies for successively performing a plurality of different operations on a blank in combination with means for successively transferring blanks from one die to the next successive die said means comprising, a lower conveyor for receiving stampings from one of said dies and moving them to a position between successive dies, an upper conveyor including a pair of spaced parallel members for moving said stampings from a position between successive dies into position in the next successive die, means for simultaneously reciprocating said lower conveyor and said members longitudinally in opposite directions with a dwell at the limits of their movement in both directions, means for simultaneously reciprocating said members transversely in opposite directions with a dwell at the limits of their movements in both directions, said lower conveyor and said members being reciprocated longitudinally during the dwells in the transverse movement of said members and said members being reciprocated transversely during the dwells in their longitudinal movement, an elevator mechanism for lifting stampings from said lower conveyor up into position to be engaged by the said members of said upper conveyor and means for operating said elevator mechanism in timed relation to the operations of said conveyors.

WILLIAM F. LONGFIELD.